United States Patent [19]
Connors

[11] 3,760,249
[45] Sept. 18, 1973

[54] COARSE-FINE ANALOG POSITIONING SYSTEM

[75] Inventor: John J. Connors, West Seneca, N.Y.

[73] Assignee: Westinghouse Electric Corporation, Pittsburgh, Pa.

[22] Filed: Mar. 30, 1971

[21] Appl. No.: 129,502

[52] U.S. Cl............... 318/592, 318/653, 318/658, 72/26, 318/597
[51] Int. Cl. ........................................ G05b 11/18
[58] Field of Search................ 318/592, 597, 653, 318/656, 658; 72/26

[56] References Cited
UNITED STATES PATENTS

| | | | |
|---|---|---|---|
| 3,498,093 | 3/1970 | Eisele et al. | 72/26 X |
| 3,467,900 | 9/1969 | Benton | 318/592 |
| 2,088,659 | 8/1937 | Mosley | 318/658 X |
| 3,382,422 | 5/1968 | Meir | 318/597 |
| 3,477,027 | 11/1969 | Jablonski | 318/658 X |
| 2,730,664 | 1/1956 | Karlson | 318/658 X |
| 2,415,819 | 2/1947 | Halpert et al. | 318/653 |
| 2,825,859 | 3/1958 | Quade | 318/653 |
| 2,926,345 | 2/1960 | Roeger | 318/592 X |
| 3,010,063 | 11/1961 | Rhoades | 318/592 |
| 3,011,113 | 11/1961 | Jerue et al. | 318/592 |
| 3,151,282 | 9/1964 | Fisher | 318/592 |

Primary Examiner—T. E. Lynch
Attorney—F. H. Henson, R. G. Brodahl and J. J. Wood

[57] ABSTRACT

An accurate closed loop analog positioning system utilizing a linear sensor of the type employing a magnetic sensing element and a balance coil which acts basically as a transformer so as to eliminate direct current drift which is prevalent in most analog positioning systems. The magnetic sensing element is preferably mounted on the periphery of a disc of insulating material geared to a machine part which travels along a linear path of travel such that the disc will rotate through less than one complete revolution as the machine part moves from one end of its path of travel to the other. By causing the sensing element to rotate to a position where it is directly opposite the balance coil, the drive motor driving the machine part can be made to slow down and stop at that exact point.

6 Claims, 5 Drawing Figures

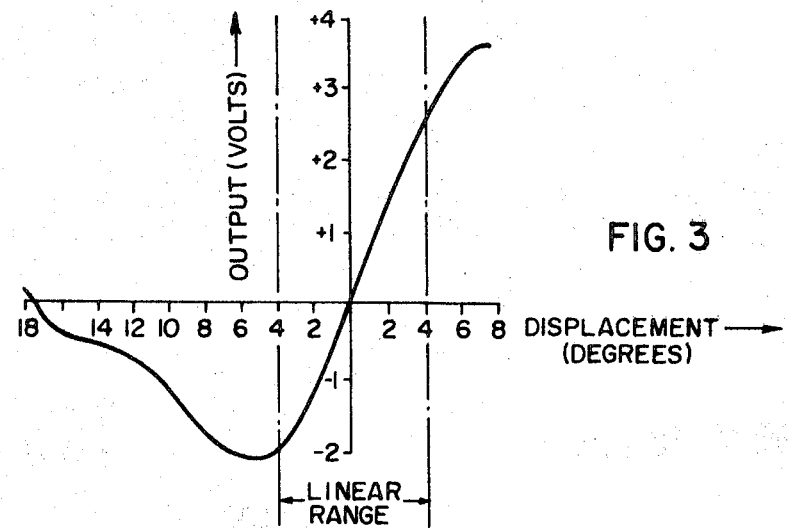
FIG. 3
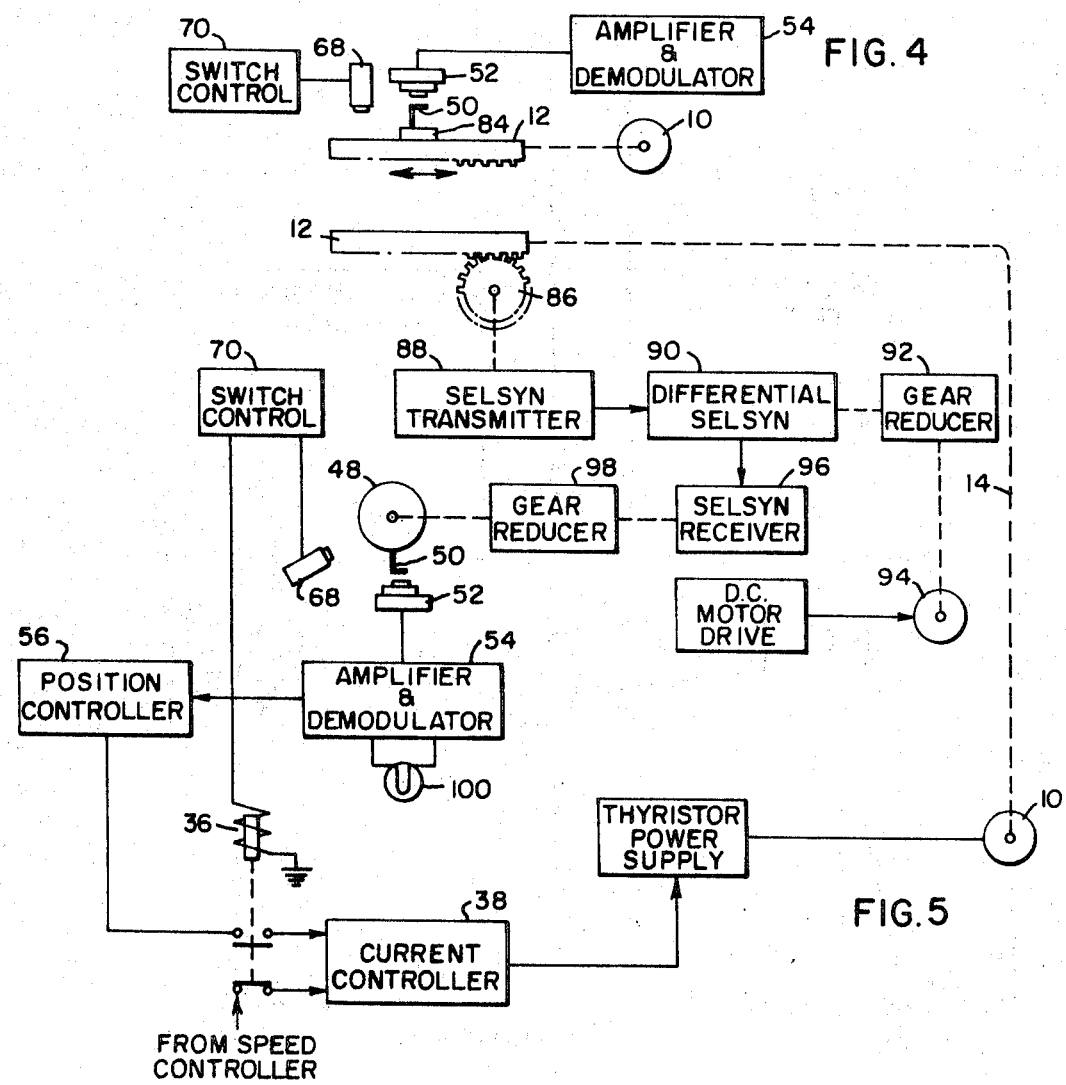
FIG. 4
FIG. 5

COARSE-FINE ANALOG POSITIONING SYSTEM

BACKGROUND OF THE INVENTION

As is known, digital positioning regulators have been used extensively for controlling the position of a machine element or the like driven by a motor. The positioning accuracy of these regulators is limited only by the final stop characteristic of the drive motor. Field results show that digital position regulators of this type perform adequately; however, they are relatively complex and costly. Digital position regulators can be replaced by analog regulators; however these are subjected to two problems, namely, direct current amplifier drift and an accurate, reliable position feedback arrangement.

SUMMARY OF THE INVENTION

In accordance with the present invention, an accurate closed loop analog positionIng system is provided which eliminates the problem of direct current amplifier drift as well as the problems encountered in attempting to provide an accurate, reliable position feedback.

Specifically, there is provided, in a system of the type wherein an element is driven along a fixed path of travel by a drive motor, a member, preferably a rotary member, which is mechanically coupled to the element such that movement of the element along its entire path of travel will cause the rotary member to rotate through less than one revolution. A magnetic element is carried by the rotary member at one point about its periphery. Control circuitry including balance coil means is located at a fixed point about the periphery of the rotary member and is adapted to produce an output signal which approaches zero when the magnetic element is rotated toward the coil means in either direction.

A speed controller feeding into a current controller normally controls the aforesaid drive motor at a speed determined by a speed reference signal applied to the speed controller. Position controller means comprising an integrating operational amplifier is connected to the control circuitry coupled to the balance coil means. Means, preferably a proximity switch, is located adjacent the aforesaid rotary element such that when the magnetic element carried by the rotary member approaches the balance coil means, the speed controller will be disconnected from the current controller and connected instead to the aforesaid integrating operational amplifier. Further movement of the motor will then be under the control of the position controller which reduces its output signal to zero as the element reaches its desired stop position and, hence, stops the motor when the element being driven reaches its desired position.

It will be appreciated, of course, that instead of carrying the magnetic element on a rotary member which is mechanically coupled to the element being driven, it may also be carried on the driven element itself which, for example, may move along a linear path of travel. Further, in accordance with the invention, the element which is driven by the motor may be connected to a selsyn transmitter which feeds into a differential selsyn controlled by a direct current motor. The output of the differential selsyn is then applied to a selsyn receiver which drives a rotary member carrying the aforesaid magnetic element such that the amount of movement at one input to the differential selsyn will determine the position at which the element will stop.

The above and other objects and features of the invention will become apparent from the following detailed description taken in connection with the accompanying drawings which form a part of this specification, and in which:

FIG. 3 is a curve illustrating the output characteristics of the position sensor of the invention;

FIG. 4 illustrates an alternative embodiment of the invention wherein the magnetic element on the position sensor is carried on a member which moves linearly with an element to be moved rather than in a circular path of travel; and FIG. 5 is a schematic illustration of still another embodiment of the invention employing a selsyn receiver and transmitter and which can be adjusted to stop a driven element at anY one of a plurality of preset locations.

DESCRIPTION OF THE PREFERRED EMBODIMENTS

Figure 1:
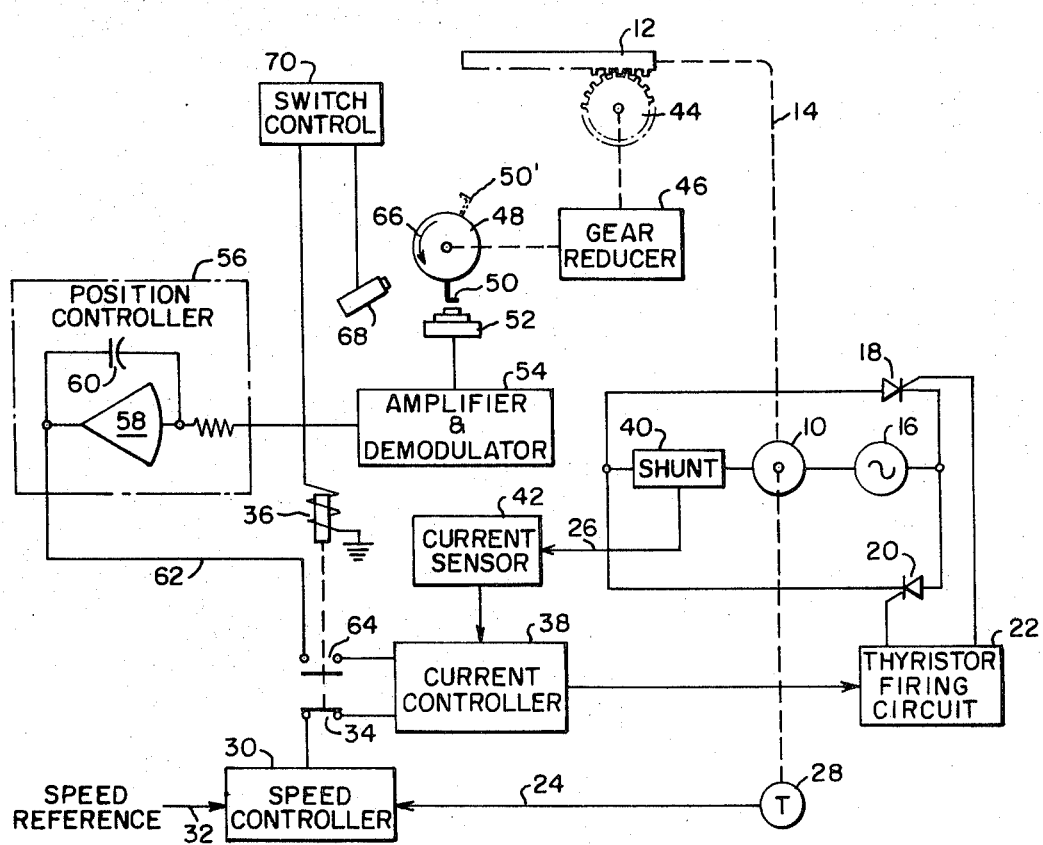
FIG. 1 is a schematic diagram of one embodiment of the invention.

With reference now to the drawings, and particularly to FIG. 1, a drive motor 10 is shown connected to a machine element 12 through a mechanical linkage, schematically illustrated at 14, which causes the machine element to move along a linear path of travel. The motor 10 is connected to a source of alternating current supply voltage 16 through a dual converter, schematically illustrated by forward and reverse thyristor elements 18 and 20. As will be understood, the thyristor element 18, in the case of a three-phase alternating current supply system, represents six separate thyristors which are fired during the aforesaid mode of operation of the motor 10. Similarly, the thyristor element 20 represents six separate thyristors which are operative during the reverse mode of operation of the motor. It will be appreciated, of course, that instead of using a thyristor supply for the motor 10, a mechanically driven generator can be used equally as well.

In the usual motor control system for a motor such as motor 10, the speed of the motor is controlled and regulated by feedback loops which are connected to control the power which the thyristors supply to the motor via thyristor firing circuit 22. In a typical system there are three such loops. An outermost speed loop regulates and responds to a feedback signal from the motor supplied through a tachometer generator or other motor-speed responsive device; an intermediate current loop regulates responsive to the feedback supplied through a current shunt which transmits a signal proportional to the current supplied to the motor; and an innermost voltage loop regulates responsive to the feedback dependent on the voltage directly controlling the motor. This last feedback, for example, may be proportional to the net armature voltage of the motor.

In the schematic illustration given in FIG. 1, only the outermost speed loop 24 and the intermediate current loop 26 are shown. The outermost speed loop includes a tachometer generator 28 connected to the motor 10 and adapted to produce an output signal proportional to the speed of the motor. This signal is applied to the input of a speed controller 30 which conventionally comprises a proportional plus integral controller. Also applied to the speed controller 30 and summed with the feedback signal from tachometer generator 28 is a speed reference signal on lead 32 which, for example, may be adjusted manually by an operator for a desired motor speed.

The output of the speed controller 30, in turn, is applied through normally closed contacts 34 of relay 36 to the input of a current controller 38 which is also a proportional plus integral controller. The current controller, in turn, controls the thyristor firing circuit 22. The current through the motor is sensed, as by means of a shunt 40 in its armature circuit, and applied through a current sensor 42 which, in turn, applies a feedback signal to the current controller 38 to limit the upper and lower maximum values of current supplied to the motor 10.

The element 12 which is driven by the motor 10 is connected through gear 44 and gear reducer 46 to a disc 48 of insulating material. Carrierd on the insulating disc 48, at one point about its periphery, is a magnetic (i.e., magnetically permeable) finger or element 50 adapted to pass in close proximity to a balance coil assembly, schematically illustrated by the reference numeral 52 in FIG. 1. The balance coil assembly 52, in turn, is connected to an amplifier and demodulator 54. While the balance coil assembly and the amplifier and demodulator 54 will hereinafter be described in detail in connection with FIG. 2, for purposes of the present description it will suffice to say that as the magnetic finger 50 approaches the balance coil assembly 52, the output of the amplifier and demodulator 54 will decrease until it is zero when the finger is directly opposite the balance coil assembly 52.

The output of the amplifier and demodulator 54 is then applied to a position controller 56 comprising an integrating operational amplifier 58 having a capacitive feedback path 60. The output of the position controller 56 is adapted to be applied through lead 62 and normally open contacts 64 of relay 36 to the current controller 38.

The gear reducer 46 is such that the insulating disc 48 will rotate through less than one revolution as the machine element 12 travels from one end of a path of travel to the other. If it is assumed, for example, that the magnetic finger is in the dotted-line position 50' shown in FIG. 1, the relay 36 will be deenergized and contacts 34 will be closed while contacts 64 are open. Under these circumstances, the motor 10 can be driven in the forward or reverse direction under the control of the speed reference signal applied to lead 32. However, as the disc 48 rotates in the direction of arrow 66, the magnetic finger 50 will pass a magnetic pickup 68 which, in turn, actuates a switch control circuit 70 to energize relay 36, thereby disconnecting the current controller from speed controller 30 and connecting it through contacts 64 to the position controller 56.

The motor is now under the control of the position controller 56 and will slowly move to a stop with the finger 50 adjacent the balance coil assembly 52. This insures that the element 12 will stop at the predetermined location. Of course, by varying the position of the finger 50 on disc 48 or by selectively connecting the disc 48 to the gear reducer 46 through a clutch or the like so that it may assume selected angular positions, the point at which the element 12 will stop can be varied. After the element 12 is once positioned, the relay 36 can again be deenergized by manual manipulation of the switch control circuit 70 such that the motor will again be under the control of the speed reference signal applied to the lead 32.

Figure 2:
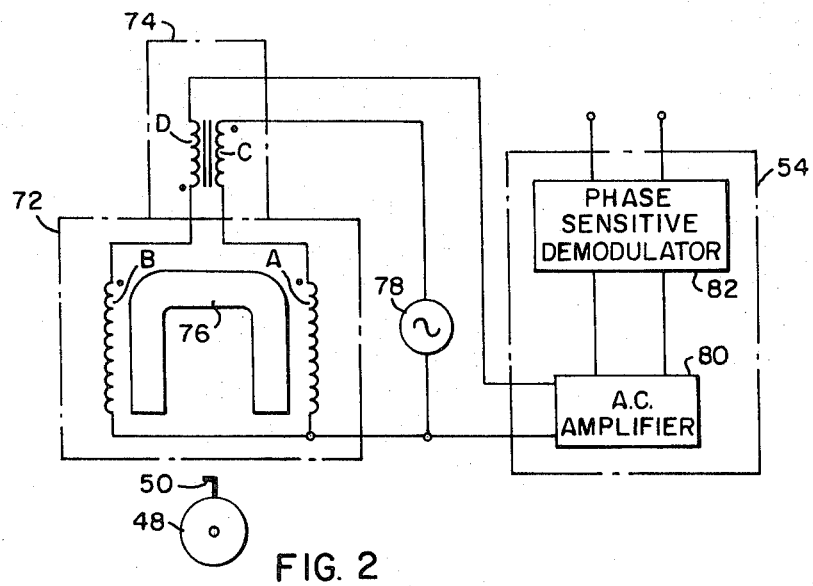
FIG. 2 is a detailed schematic diagram of the position sensor apparatus of the invention.

The details of the balance coil assembly 52 and the amplifier and demodulator 54 are shown in FIG. 2. The position sensor may comprise a P-001 alternating current amplifier and phase sensitive demodulator manufactured by Westinghouse Electric Corporation, Buffalo, N.Y. It consists of three components, namely, a sensing element 72, a balance element 74, and an actuating member which comprises the finger 50 carried on the disc 48. The sensing element 72 contains a U-shaped core 76 with windings A and B facing the sensing surface. Winding A is connected to balance element winding C which is then connected to an alternating current power source 78. Winding B is connected to balance element winding D which connects to an alternating current amplifier 80 in circuit 54. The polarity of the windings is indicated by the dots associated with each winding. The output from the alternating current amplifier 80 serves as an input to a phase sensitive demodulator 82.

Bringing the magnetic finger 50 near the sensing element 72 increases the magnetic coupling between windings A and B and, thus, the voltage induced in the winding B. The alternating current output or the input to the alternating current amplifier 80 is the difference of the voltages across windings B and D. Therefore, maximum coupling between the windings A and B due to the actuating member produces a maximum signal to the alternating current amplifier 66. With minimum coupling between windings A and B, the input to the alternating current amplifier 80 is again maximum but is 180° out of phase with respect to the reference signal from alternating current supply 78. The input to the alternating current amplifier 80 is zero when the voltage induced in the windings B and D is zero; and this occurs when the magnetic finger 50 is directly opposite the sensing element 72.

The alternating current which serves as an input to the alternating current amplifier 80 is amplified and then converted to a direct current by the phase sensitive demodulator 82 such that the output is positive with respect to ground when the output from the amplifier 80 is in phase with the reference signal and is negative when the amplifier output is 180° out of phase with respect to the alternating current reference.

With reference now to FIG. 3, the output characteristics for the position sensor described and shown in FIG. 2 are illustrated by a graph relating displacement in degrees to the direct current output of the position sensor. It should be noted that the transfer curve is linear over the range near zero degree. Due to the action of switch control 70 and relay 36 described above, it is only in this linear range that the output of the amplifier and demodulator circuitry 54 is utilized as a control signal to the current controller 38. Thus, as the element 12 approaches its desired position, the speed with which it approaches gradually decreases until reaching the exact position. At this point, there is no output signal being generated by the position sensor and the motor stops.

In FIG. 4, another embodiment of the invention is shown wherein elements corresponding to those of FIG. 1 are identified by like reference numerals. In this case, the motor 10 is again connected to a machine element 12 to cause it to reciprocate along the direction of the arrow shown. The magnetic finger 50, however, is now carried on an insulating block 84 mounted on the machine element 12. The sensing windings 52 are positioned at a fixed point adjacent the element 12 such that the finger 50 will pass therebeneath and will alter the magnetic coupling of the winding means. At the same time, the balance windings 52 must be positioned far enough away from the element 12 and any other metal member such that it will not itself affect the magnetic coupling of the windings. The magnetic proximity switch 68 is positioned adjacent the sensing windings 52 such that as the element 12, for example, moves from left to right, the switch control 70 will disconnect a speed controller from a current controller and, in turn, connect a position controller to the current controller for motor 10. Aside from this, the operation of the embodiment of FIG. 4 is similar to that of FIG. 1.

In FIG. 5, still another embodiment of the invention is shown wherein the machine element 12 is connected through gear 86 to a selsyn transmitter 88. The selsyn transmitter 88, in turn, is connected to a differential selsyn 90 having a shaft connected through gear reducer 92 to a direct current drive motor 94. The output of the differential selsyn 90, in turn, is connected to a selsyn receiver 96 which, through gear reducer 98, drives the insulating disc 48 corresponding to the disc 48 shown in FIG. 1.

Aside from this, the operation of the invention is the same as that in FIG. 1. The driven element 12 is set to any desired position within its travel. Next, the differential selsyn is driven by the direct current motor 94 until the actuator is aligned with the sensor. This point can be indicated by energization of a "zero error light" 100 connected to the demodulator 54. The position regulator is now preset and the drive may be moved to any position. When it is desired to move the element 12 to the preset position, the position controller will automatically control the drive to that position. The present position will always be retained so long as alternating current power is supplied to the selsyn system or until another preset position is selected by driving motor 94 in one direction or the other.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a system of the type wherein an element is driven along a fixed essentially linear path of travel by a drive motor, the combination of a rotary member mechanically coupled to said element such that movement of the element along its entire path of travel will cause the rotary member to rotate through no more than one revolution, a magnetic element carried by said rotary member at one point about its periphery, control circuitry including balance coil means positioned adjacent a point in the rotary path of travel of said magnetic element on said rotary member and adapted to produce an output signal which approaches zero when said magnetic element is moved toward said coil means, means including a speed con-troller feeding into a current controller for normally con-trolling said motor at a speed determined by a speed reference signal applied to said speed controller, and switch means automatically actuated when said magnetic element approaches said balance coil means for disconnecting said speed controller from said current controller and for connecting said control circuitry to the current controller, whereby as said output signal approaches zero said element will be caused to decelerate and stop with said magnetic element adjacent said balance coil means.

2. The system of claim 1 wherein said control circuitry includes an integrating operational amplifier connected to said balance coil means, the switch means being adapted to connect the output of said integrating operational amplifier to said current controller.

3. The system of claim 1 wherein said rotary member is formed from insulating material.

4. The system of claim 1 wherein said output signal, when said switch means is actuated, is linear and proportional to the relative displacement of said element from said balance coil means.

5. The system of claim 1 including electrical circuitry for varying the point at which said element will stop in its path of travel with said magnetic element being adjacent the balance coil means.

6. The system of claim 5 wherein said electrical circuitry includes a selsyn transmitter connected to said driven element, a differential selsyn provided with a drive motor and connected to the output of said selsyn transmitter, and a selsyn receiver connected to the output of said differential selsyn and mechanically connected to said magnetic element.

* * * * *